(12) United States Patent
Cretors

(10) Patent No.: US 6,374,727 B1
(45) Date of Patent: Apr. 23, 2002

(54) POPCORN KETTLE WITH INTEGRATED AGITATOR

(75) Inventor: Charles D. Cretors, Lake Forest, IL (US)

(73) Assignee: C. Cretors, Chicago, IL (US)

( * ) Notice: Subject to any disclaimer, the term of this patent is extended or adjusted under 35 U.S.C. 154(b) by 0 days.

(21) Appl. No.: 09/838,073

(22) Filed: Apr. 19, 2001

(51) Int. Cl.[7] .................................................. A23L 1/18
(52) U.S. Cl. ...................... 99/323.9; 99/323.5; 99/348; 366/185
(58) Field of Search .......................... 99/323.9, 323.5, 99/323.7, 323.6, 323, 8, 323.11, 348; 366/205, 185

(56) References Cited

U.S. PATENT DOCUMENTS

| | | | |
|---|---|---|---|
| 1,501,114 A | * 7/1924 | Howe | 366/185 |
| 2,248,812 A | * 7/1941 | Cretors | 99/323.9 |
| 2,477,416 A | * 7/1949 | Page | 99/323.9 |
| 4,173,925 A | * 11/1979 | Leon | 99/348 |
| 4,648,719 A | * 3/1987 | Röben | 366/185 X |
| 4,649,263 A | 3/1987 | Goodlaxson | |
| 5,787,798 A | 8/1998 | Stein et al. | |
| 5,979,301 A | 11/1999 | Perttola | |
| 6,164,192 A | 12/2000 | Stein | |
| 6,164,193 A | 12/2000 | Perttola | |

* cited by examiner

Primary Examiner—Reginald L. Alexander
(74) Attorney, Agent, or Firm—Mayer, Brown, Rowe &Maw

(57) ABSTRACT

An integrated popcorn kettle is disclosed which is used in conjunction with a popcorn machine. The popcorn kettle has a cooking chamber which has a hinged lid. A motor chamber is located under the cooking chamber. An electrical motor is located in the motor chamber and rotates an agitator in the cooking chamber. The bottom of the cooking chamber has a heating element which is used to cook the popcorn. The motor is actuated to rotate the agitator in order to insure heat distribution for the popcorn. The entire popcorn kettle including the motor chamber and the cooking chamber may be pivoted as a unit in order to dump out the finished popcorn. In this configuration, no extra mechanical parts are needed to suspend the agitator into the kettle.

24 Claims, 9 Drawing Sheets

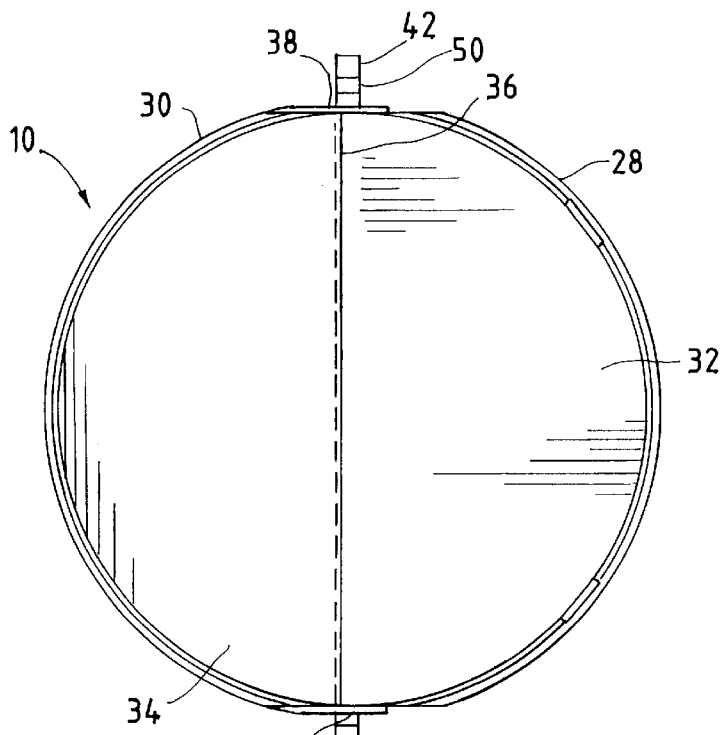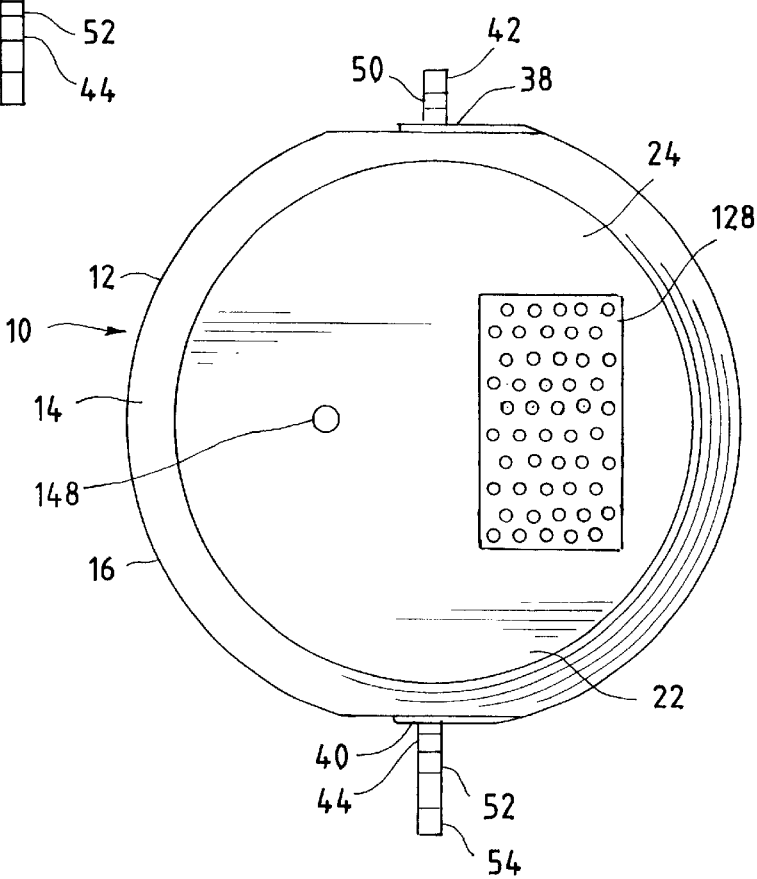

US 6,374,727 B1

POPCORN KETTLE WITH INTEGRATED AGITATOR

FIELD OF INVENTION

This invention relates to a kettle used for preparing popcorn and more specifically, to a popcorn kettle which uses an integrated agitator to stir corn during the popping operation.

BACKGROUND OF INVENTION

Popcorn popping machines for concession stand, restaurant or home use are well known. Generally, such popping machines have a cabinet or case in which the popcorn is both cooked and stored. The unpopped corn (kernels) is typically loaded into a kettle suspended from the top of the popcorn case, combined with cooking oil, and heated. The kettle is a metal container with an open top which allows heat distribution to the kernels and oil. The kettle has electrical or gas heating elements to heat the oil and corn kernels and thereby effect popping of the kernels.

The kettle has a lid to cover the kettle during the popping operation. The kettle is heated by the heating elements to pop the popcorn within the chamber. The lid prevents the popcorn and oil from being released until the popping operation is nearly completed. The lid may include a hinged portion that opens as the volume of popped popcorn increases within the chamber. When the popping operation is completed, the kettle assembly is usually tilted, opening the lid, to release the remaining popped popcorn for service.

The use of cooking oil functions to coat the corn kernels to insure even distribution of heat throughout the kernel. Additionally agitating the kernels is necessary to prevent the kernels from burning at the bottom of the kettle where more heat is applied. In order to mix the corn kernels with the cooking oil, and for insuring an even popping of all the corn, an agitator mechanism is generally provided within the kettle. The agitator mechanism is typically a rotating stirring blade which is rotated by an agitator rotor shaft which is driven by a conventional electric motor.

In a base mounted popcorn kettle, the agitator rotor shaft enters the popping kettle through a centrally located aperture in the bottom of the popping bowl. In other configurations, the agitator rotor shaft will enter the popping kettle through an aperture through the lid. Unfortunately, in either of these assemblies, the kettle lid and the kettle itself must still be tilted which interferes with the rotor shaft which must be inserted in the kettle during the cooking operation. Thus, the rotor shaft must be unconnected when the kettle is tilted and reconnected for the cooking operation. This connection and reconnection process requires greater mechanical complexity in kettle assembly and popcorn popper designs. Additionally, the use of such a mechanism is inherently unreliable.

Thus, there is a need for an integrated popcorn kettle with a self-contained agitator mechanism. There is a further need for a popcorn kettle which does not require excessive mechanical parts to remove an agitator when the kettle is tilted after the popping operation. There is also a need for a popcorn kettle with integrated components which does not require additional components mounted outside the kettle.

SUMMARY OF THE INVENTION

These needs may be addressed by the present invention, which is embodied in a kettle assembly for popping corn. The kettle assembly has a cooking chamber. A motor chamber is located beneath the cooking chamber and a motor is mounted in the motor chamber. An agitator is located in the cooking chamber. The agitator is rotatably propelled by the motor. A pivot structure allows cooking chamber and motor chamber to be tilted to expel popcorn from the cooking chamber.

The invention may also be embodied in a popcorn kettle for the preparation of popcorn. The kettle has a generally cylindrical body with an open top end. A cooking chamber is formed by a conical side wall and a bottom plate. The cooking chamber is suspended from the open top end of the cylindrical body. A motor chamber is formed by the bottom end of the cylindrical body and an intermediate plate. A motor is mounted in the motor chamber. An agitator extends through the bottom plate of the cooking chamber and is rotatably propelled by the motor.

Another embodiment of the invention is a popcorn machine for popping popcorn. The machine has a cabinet which holds finished popcorn. A kettle is suspended in the cabinet. The kettle includes a cooking chamber having a bottom. A heating element is located in the bottom of the cooking chamber. A motor chamber is located beneath the cooking chamber. A motor is mounted in the motor chamber. An agitator is located in the cooking chamber, the agitator being rotatably propelled by the motor. The kettle is normally in an upright position and is tiltable to expel popcorn from the cooking chamber.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 4 is a top view of the popcorn kettle of FIG. 1;

FIG. 5 is a bottom view of the popcorn kettle of FIG. 1;

DESCRIPTION OF THE PREFERRED EMBODIMENT

Figure 1:
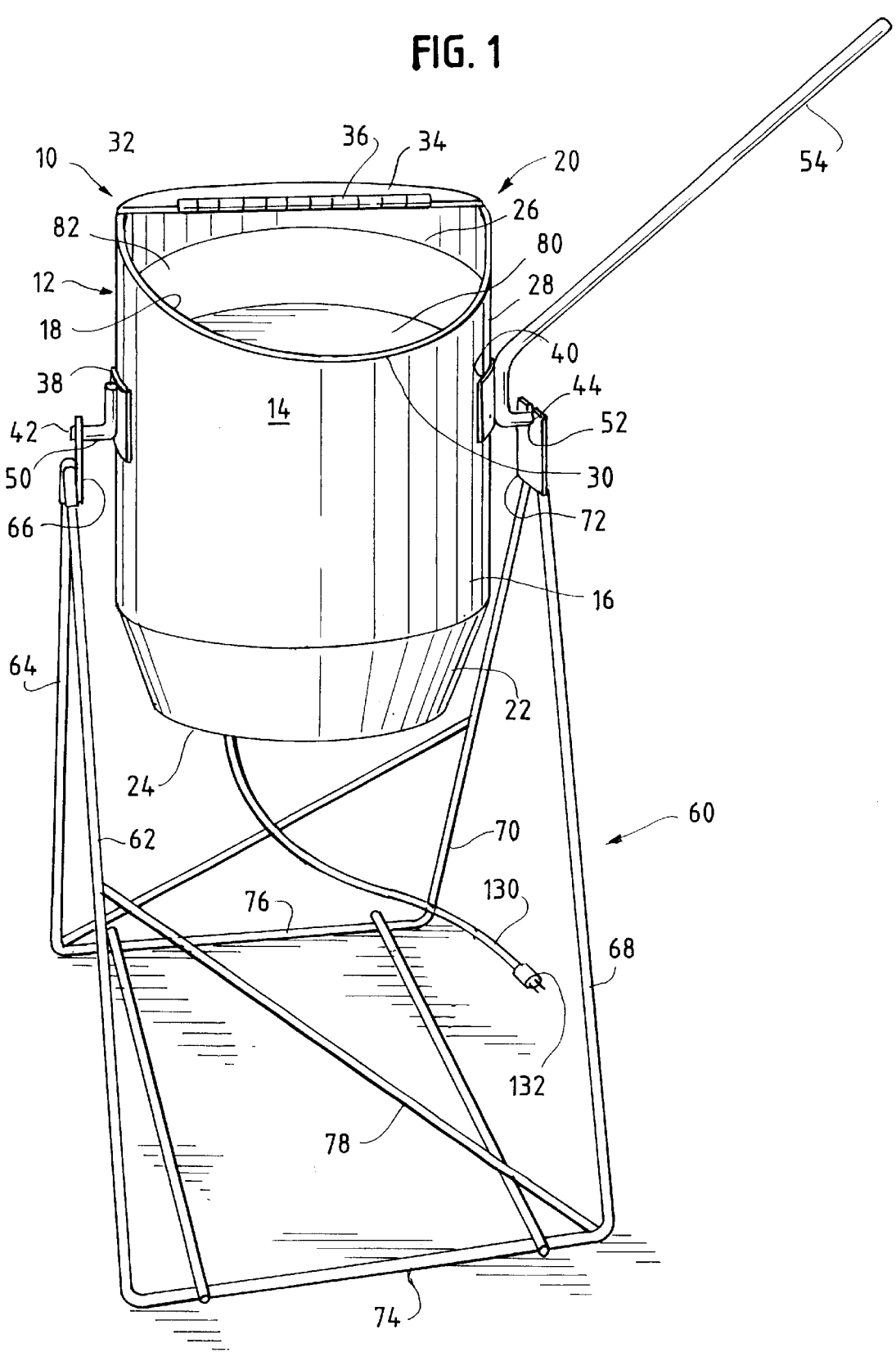
FIG. 1 is a perspective view of an integrated component popcorn kettle according to one embodiment of the present invention.
Figure 2:
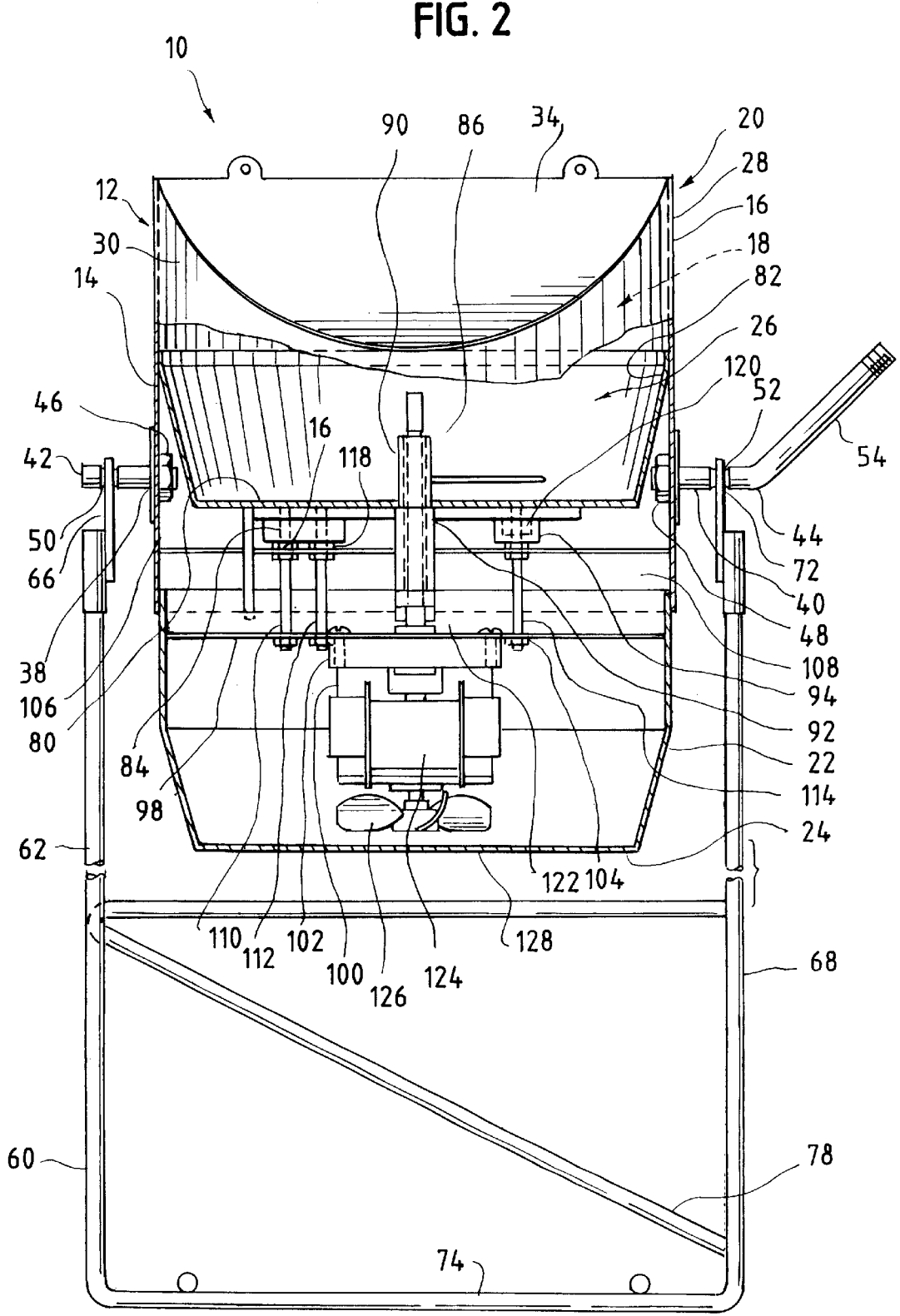
FIG. 2 is a front view of the integrated component popcorn kettle of FIG. 1.
Figure 3:
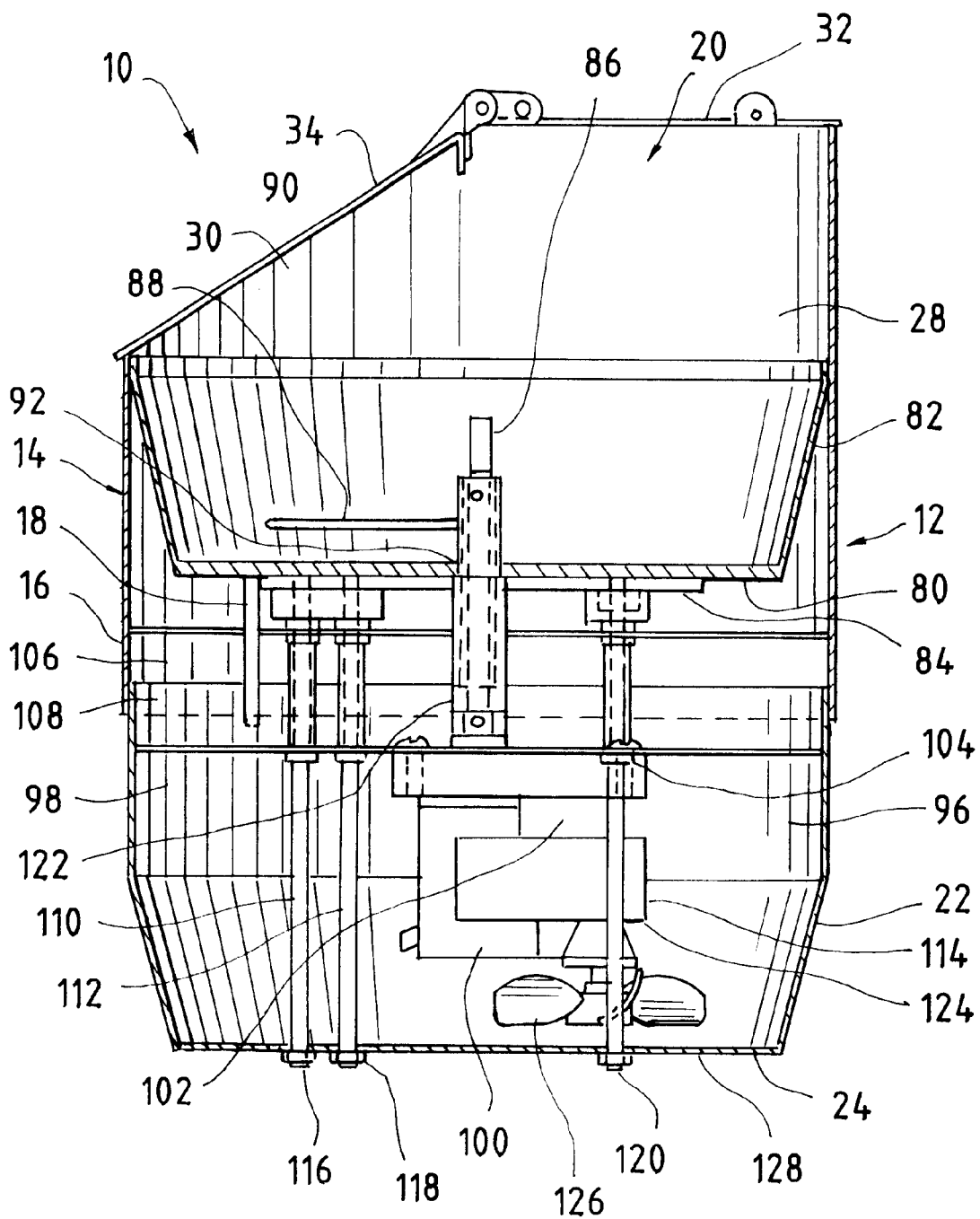
FIG. 3 is a side view of the popcorn kettle of FIG. 1.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows a perspective view of a popcorn kettle fixture 10 which is one embodiment of the present invention. The popcorn kettle fixture 10 will be explained with reference to FIG. 1 and FIGS. 2–5, which show front, side, top and bottom views of the popcorn kettle fixture 10. The popcorn kettle fixture 10 includes a popcorn kettle 12 which has a cylindrical main body 14 with an exterior surface 16 and an interior surface 18. The kettle 12 has a top portion 20 and a tapered bottom portion 22 which is enclosed by a circular plate 24. The top portion 20 includes a tapered cylindrical cooking compartment 26. The top portion 20 has a roughly semi-cylindrical wall portion 28. The wall portion 28 is joined to a sloped front portion 30.

A semi-circular cover 32 covers the wall portion 28. A semicircular lid 34 swings on a hinge 36 which is mounted on the plate 32. The semicircular lid 34 is of sufficient size to rest on the sloped front portion 30. The main body 14 of the popcorn kettle 12 has two opposite handle panels 38 and 40. The two panels 38 and 40 each hold a swivel shaft 42 and 44 respectively. The shafts 42 and 44 are secured to the interior surface 18 by bolts 46 and 48. The shafts 42 and 44 have annular grooves 50 and 52 respectively. By using the shafts 42 and 44, the popcorn kettle 12 may be installed in relation to a dump motor for tilting operation in an automatic popcorn machine.

In this example, the shaft 40 has an angled handle member 54. A support frame 60 has a pair of support legs 62 and 64 which are joined to a fork 66. The support frame 60 also has a pair of support legs 68 and 70 which are joined to a fork 72. The annular grooves 50 and 52 of the shafts 42 and 44 are mounted to the forks 66 and 72 allowing the kettle 12 to be pivoted relative to the support legs 62, 64, 68 and 70. The handle member 54 is used to tilt the kettle 12. The support legs 62 and 68 are joined by a base member 74 while the support legs 64 and 70 are joined by a base member 76. An internal support member 78 provides stability to the support frame 60. The combination of the support frame 60 and the kettle 12 may be thus installed in a popcorn machine.

The interior cooking compartment 26 is bounded by a bottom surface 80 and a sloped wall 82 suspended from the wall of the main body 14. The cooking compartment 26 and the kettle 12 are made of nickel plated steel in order to maximize heat distribution. Other suitable materials such as stainless steel may be used. The bottom surface 80 is circular in shape and has a heating element 84. The heating element 84 is a ring shaped coil to insure maximum distribution of heat on the bottom surface 80. An agitator 86 is mounted in the center of the bottom surface 80. The agitator 86 has a mixing blade 88 mounted on a rotating shaft 90. The rotating shaft 90 is mounted in a bushing 92 which insures that no oil leaks through the bottom surface 80. The temperature of the kettle 12 is monitored by a standard thermostat 94 which is installed in the middle of the heating element 84.

The tapered bottom portion 22 of the kettle 12 has a motor chamber 96 which is formed by the bottom plate 24 and an intermediate plate 98. An electrical motor 100 is mounted on a mounting frame 102 which is attached to the intermediate plate 98. The mounting frame 102 is attached to the intermediate plate 98 via a series of bolts 104. A hollow space 106 is formed between the intermediate plate 98 and the cooking compartment 26. Insulation material 108, which is a high temperature resistant fiberglass material in this example, provides heat insulation between the cooking compartment 26 and the motor chamber 96. However, any high temperature resistant insulation material may be used. A series of support rods 110, 112 and 114 extend from the bottom plate 80 of the cooking compartment 26 through the hollow space 106 to the bottom plate 24. The support rods 110, 112 and 114 have threaded ends and are fixed on to the bottom plate 80 by bolts 116, 118 and 120.

The motor 100 has a drive shaft 122 which drives a gear box 124 and a fan 126. The drive shaft 122 rotates the fan 126 at the motor speed. The gear box 124 performs rotation reduction and is coupled to the shaft 90 to rotate the mixing blade 88. The gear box 124 is designed to achieve a desirable rotation rate of the mixing blade 88. The fan 126 is suspended in the motor chamber 106. The bottom plate 24 has a grill 128 with a series of apertures which in conjunction with the fan 126 provides ventilation to the motor chamber 106.

Figure 6:
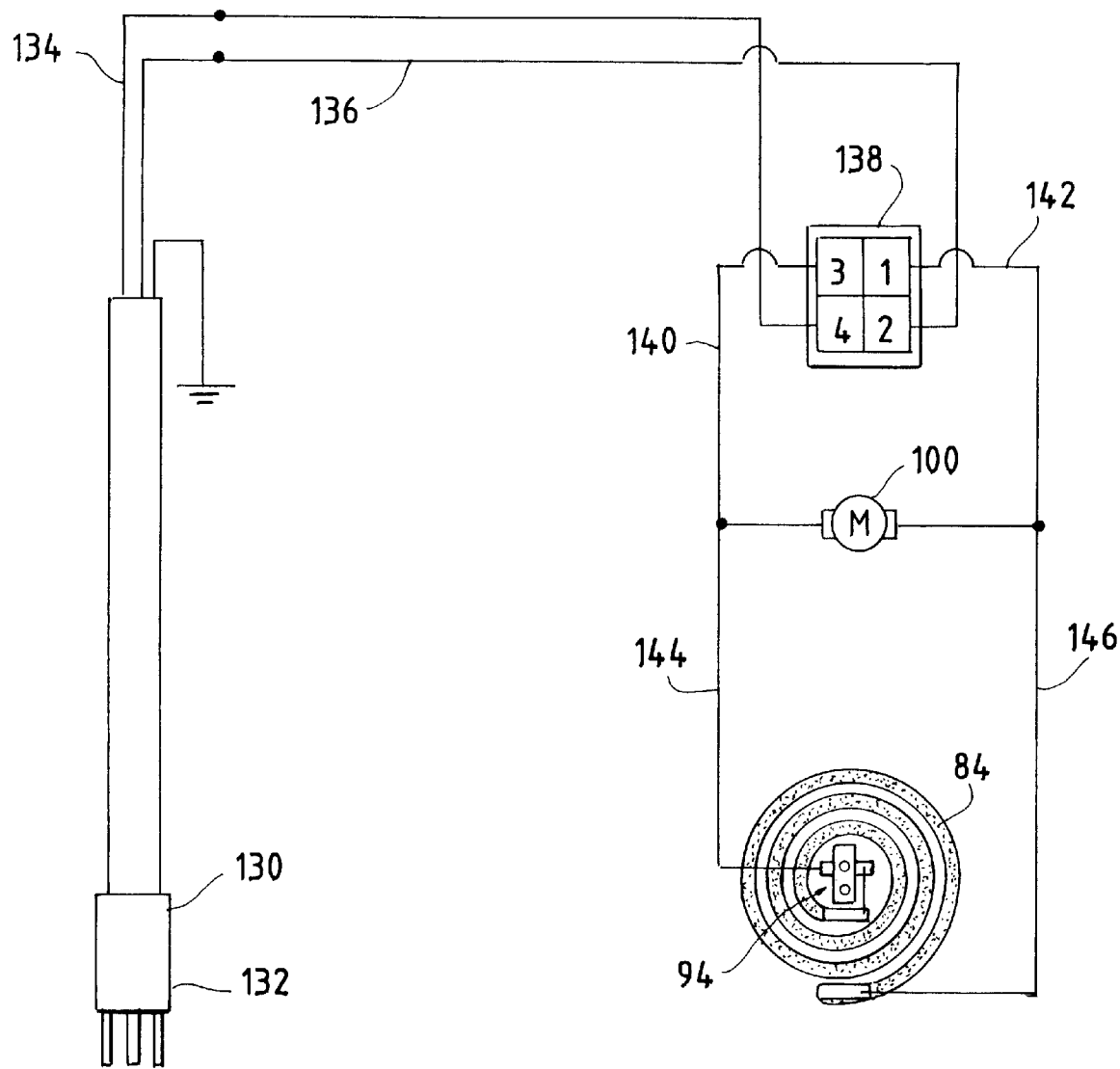
FIG. 6 is a circuit diagram of the popcorn kettle of FIG. 1.
Figure 7:
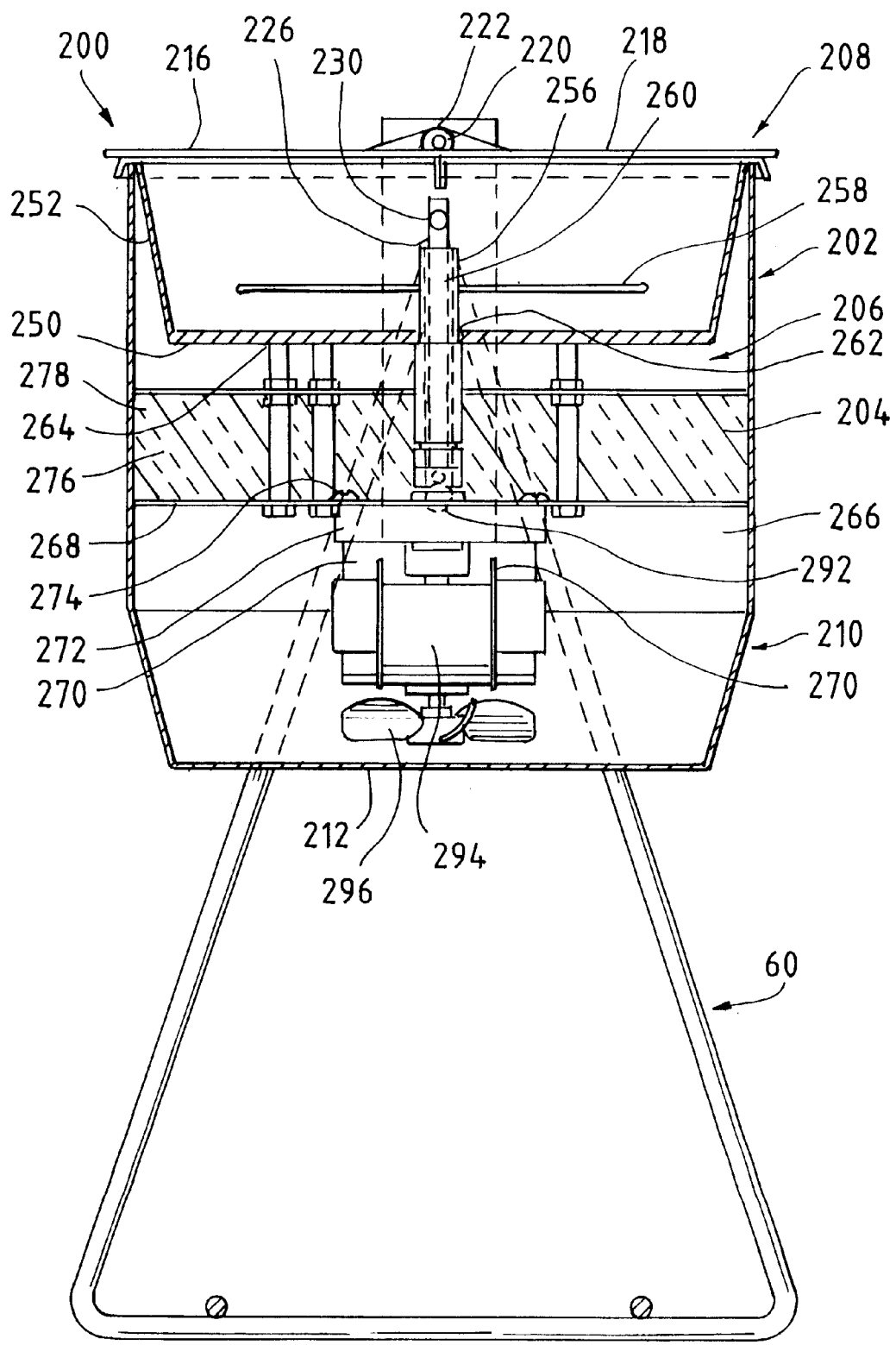
FIG. 7 is a front view of an integrated component popcorn kettle according to a second embodiment of the present invention.
Figure 8:
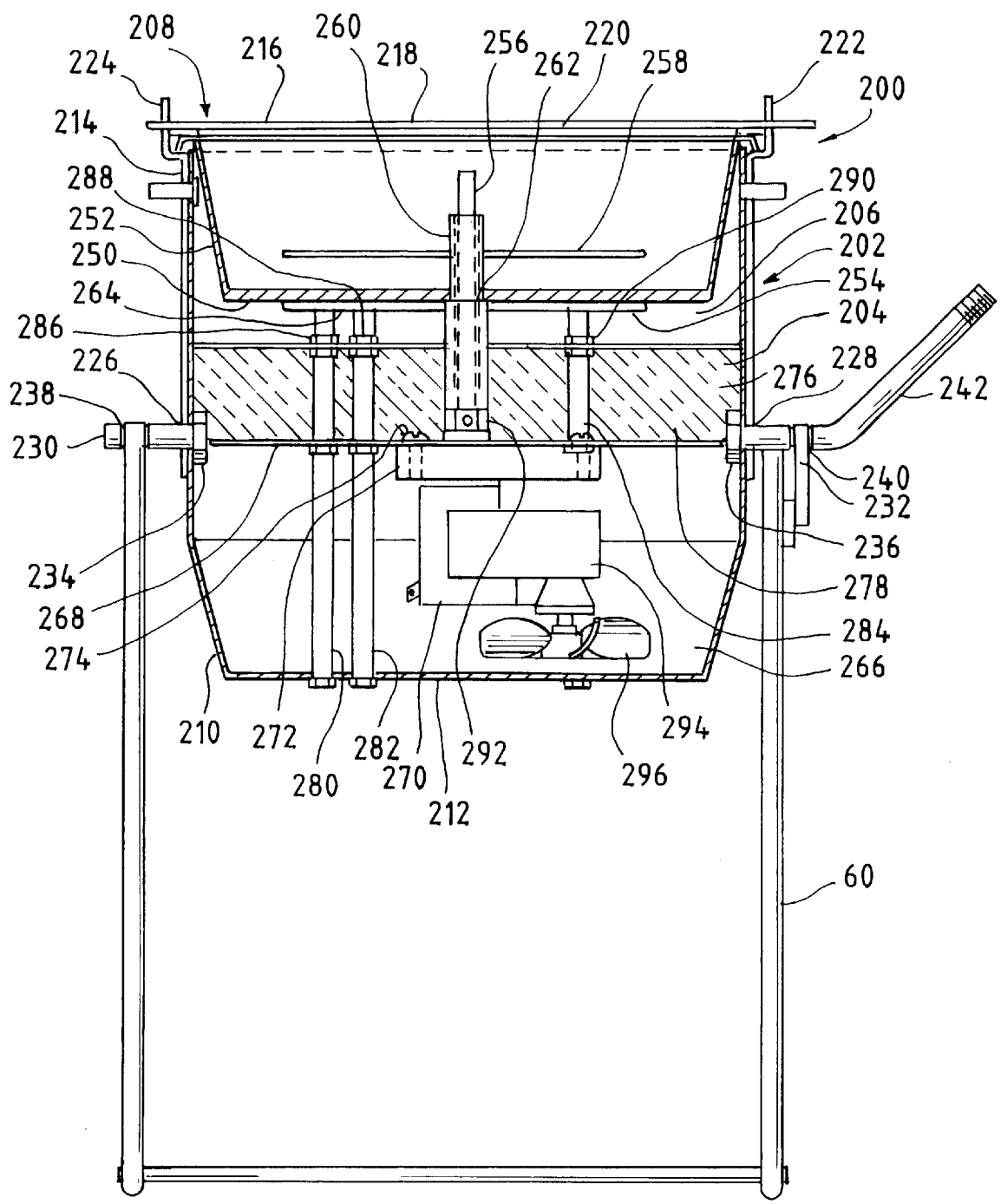
FIG. 8 is a side view of the popcorn kettle of FIG. 7.
Figure 9:
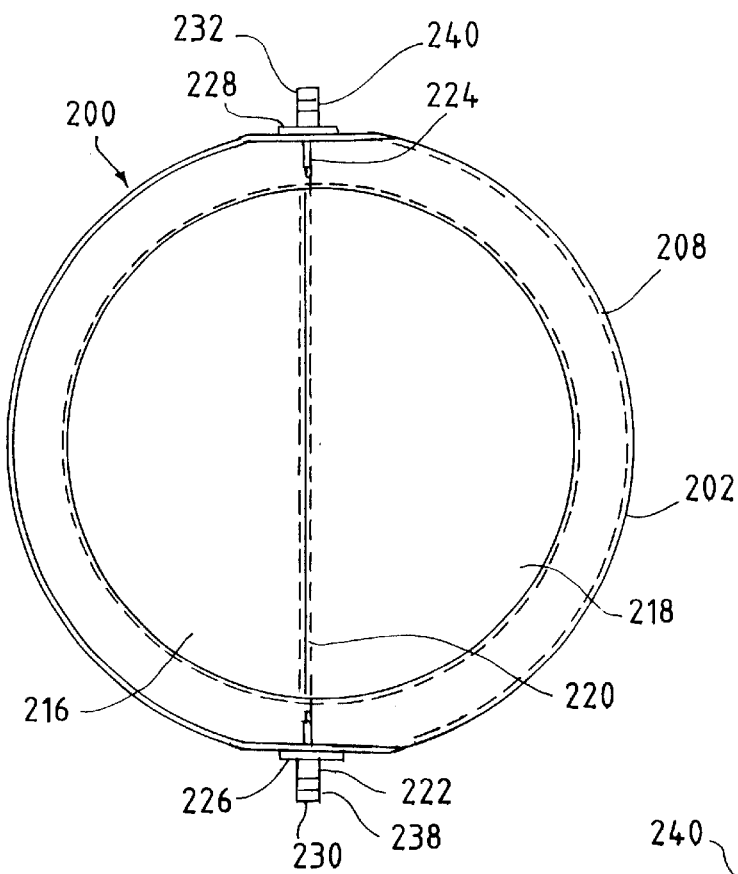
FIG. 9 is a top view of the popcorn kettle of FIG. 7.
Figure 10:
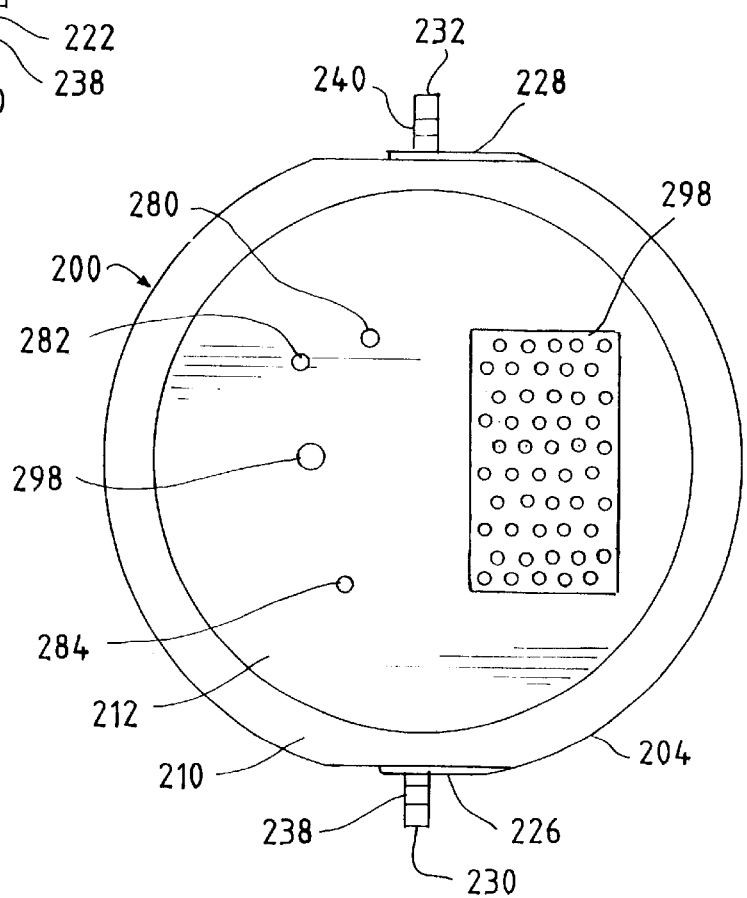
FIG. 10 is a bottom view of the popcorn kettle of FIG. 7.

The electrical connections for the kettle 12 are shown in FIG. 6, which is a circuit diagram for the electrical components described above. A power cord 130 is provided. The power cord 130 has a three prong plug 132 and has two power leads 134 and 136 which are coupled to a switch unit 138. The switch unit 138 is an on/off switch for power to the motor 100 and the heating element 84. The motor 100 is connected to the switch unit 138 via two power leads 140 and 142. The heating element 84 and thermostat 94 are also connected to the switch unit 138 via power leads 144 and 146. The power cord 130 is mounted in an aperture 148 which is made through the bottom plate 80.

The operation of the kettle 12 may be combined with other popping operations via the control of power to the motor 100 and heating element 84. The kettle 12 starts upright so the lid 34 is in the shut position. Since the center of gravity is lower than the location of the shafts 42 and 44 the kettle 12 remains upright when suspended by the shafts 42 and 44. A user then adds oil and popping corn either automatically or manually to the cooking compartment 26. Power is activated to the motor 100 and the heating element 84. The heating element 84 distributes heat across the bottom 80 and heats the oil and corn. During this phase, the motor 100 causes the agitator 86 to rotate, thus rotating the mixing blade 88 which agitates the corn in the cooking compartment 26. This action prevents the corn from being overheated and insures uniform distribution of heat. After the cooking cycle is complete, the entire kettle 12 may be tilted on the support frame 60 so the finished popcorn may be dumped out. When the kettle 12 is tilted, the lid 34 swings open. Since the motor and agitator are part of the kettle 12, the need for mechanical components to insert the agitator in the cooking compartment 26 is eliminated.

An alternative configuration is shown in FIGS. 7–10, which are front, side, top and bottom views of a popcorn kettle 200. The popcorn kettle 200 in FIGS. 7–10 is mounted on a frame 60 which is identical to that shown in FIG. 1. The popcorn kettle 200 has a cylindrical main body 202 with an exterior surface 204 and an interior surface 206. The kettle 200 has a top portion 208 and a tapered bottom portion 210 which is enclosed by a circular plate 212. The top portion 208 includes a tapered cylindrical cooking compartment 214. The top portion 208 is covered by a pair of semicircular lids 216 and 218. The lids 216 and 218 swing open on a hinge 220 which is mounted between a pair of diametrically opposed arms 222 and 224.

The main body 202 of the popcorn kettle 200 has two opposite handle panels 226 and 228. The two panels 226 and 228 each hold a swivel shaft 230 and 232 respectively. The shafts 230 and 232 are secured to the interior surface 206 by bolts 234 and 236. The shafts 230 and 232 have annular grooves 238 and 240 respectively. The shafts 230 and 232 are mounted on the frame via the annular grooves 238 and 240. The shaft 232 has an angled handle member 242 to allow a user to tilt the kettle 200.

The interior cooking compartment 214 is bounded by a bottom surface 250 and a sloped wall 252 suspended from the wall of the main body 202. The bottom surface 250 is circular in shape and has a heating element 254. An agitator 256 is mounted in the center of the bottom surface 250. The agitator 256 has a mixing blade 258 mounted on a rotating shaft 260. The rotating shaft 260 is mounted in a bushing 262 which insures that no oil leaks through the bottom surface 250. A thermostat 264 is installed on the bottom surface 250 to monitor heat in the cooking compartment 214.

The tapered bottom portion 210 of the kettle 200 has a motor chamber 266 which is formed by the plate 212 and an intermediate plate 268. An electrical motor 270 is mounted on a mounting frame 272 which is attached to the intermediate plate 268. The mounting frame 272 is attached to the intermediate plate 268 via a series of bolts 274. A hollow space 276 is formed between the intermediate plate 268 and the cooking compartment 214. Insulation material 278 in this example provides heat insulation between the cooking compartment 214 and the motor chamber 266. A series of support rods 280, 282 and 284 extend from the bottom plate 250 of the cooking compartment 214 through the intermediate plate 268 and the hollow space 266 to the plate 212. The support rods 280,282 and 284 have threaded ends and are fixed to the bottom plate 250 by bolts 286, 288 and 290.

The motor 270 has a drive shaft 292 which is coupled to the shaft 260 through a gear box 294. The gear box 294 performs rotation reduction from the motor speed to regulate the rotation rate of the agitator. The drive shaft 292 also drives a fan 296 at the motor speed. The fan 296 is suspended in the motor chamber 266. The plate 212 has a grill 298 with a series of apertures which in conjunction with the fan 296 provides ventilation to the motor chamber 266. Power lines are connected to the motor 270 via an aperture 298 in the plate 212.

The kettle 200 operates in the same manner as the kettle 12 in FIGS. 1–6. The integration of the motor 270 with the kettle 200 allows the kettle 200 to be tilted without any extra mechanical components for the agitator. The kettle 200 provides twin lids 216 and 218 which facilitate manufacture of the kettle 200.

Figure 11:
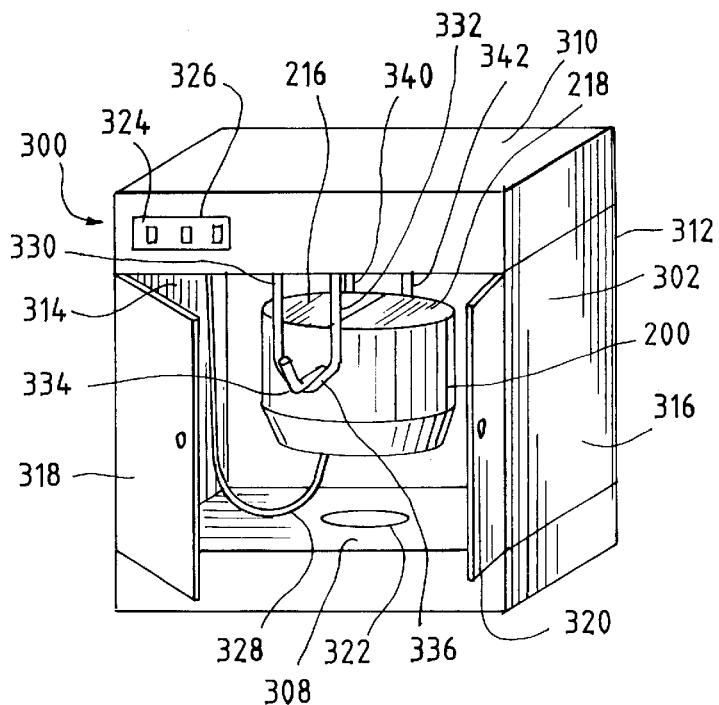
FIG. 11 is a perspective view of the popcorn kettle of FIGS. 7–10 installed in a popcorn popper unit.
Figure 12:
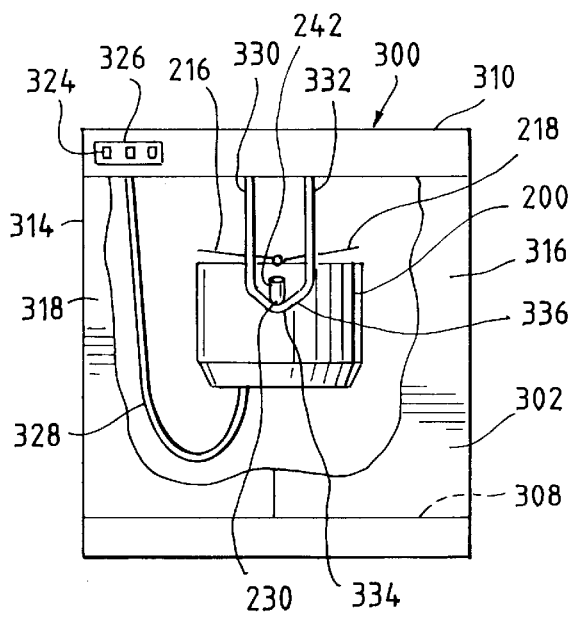
FIG. 12 is a front view of the popcorn kettle of FIGS. 7–10 installed in a popcorn popper unit.
Figure 13:
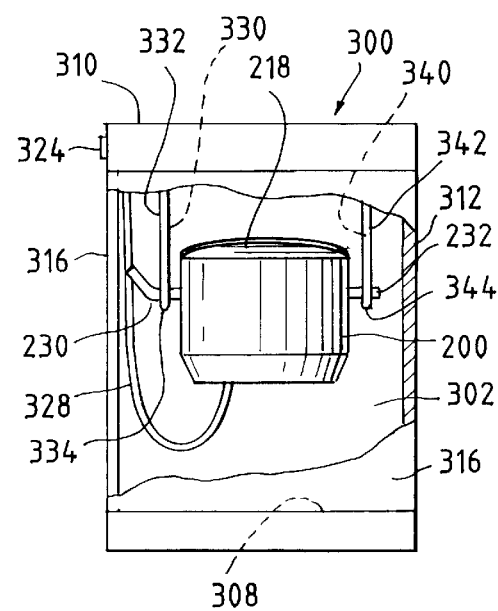
FIG. 13 is a side view of the popcorn kettle of FIGS. 7–10 installed in a popcorn popper unit.

The popcorn kettle 200 may be installed in a popcorn machine 300 as shown in FIGS. 11–13. FIGS. 11–13 are perspective, front and side views of the popcorn machine 300 where like elements are given like numbers as in FIGS. 7–10. The popcorn machine 300 includes a popcorn case or cabinet 302 within which popcorn is both produced and stored.

The popcorn case 302 has a flat bottom shelf 308 and a top 310 and is enclosed by a back panel 312 and a pair of side walls 314 and 316. The back panel 312 and the side walls 314 and 316 are typically made of tempered glass, plexiglass or other clear material to allow a view of the popping process, as well as the completed popcorn which is stored in the popcorn case 302. Access to the popcorn case 302 is provided by means of a pair of hinged doors 318 and 320, which are also made of plexiglass, to permit the operator to carry out cooking operations and to dispense popcorn when desired.

The popcorn case 302 has a hot air recirculating conditioner 322 mounted under the bottom shelf 308 which operates to force hot air through the popped corn in the popcorn case 302 to keep finished popcorn warm until it is ready to be served. An electrical control unit 324 is mounted on a panel 326 which is on the top 310. The electrical control unit 324 is powered by AC power and provides power to all of the electrical components in the popcorn machine 300 including the kettle 200. The electrical control unit 324 may be processor controlled and thus has a number of power sockets for the activation of various electrical components. Power to the kettle 200 is supplied by the control unit 324 via a power cord 328. The power cord 328 supplies electricity to the heating element 254 and agitator 256 shown in FIGS. 7–10. Electrical power is timed by the control unit 324 to power the heating element 254 for a sufficient time to complete the popping of the corn. The power cord 328 also contains electrical leads to the thermostat 264 to monitor the temperature in the cooking compartment 214.

A pair of support arms 330 and 332 are suspended from the top 310. The support arms 330 and 332 are connected by a connector 334 which has a pivot point 336 attached to the annular groove 238 of the shaft 230. A second pair of support arms 340 and 342 are suspended from the top 310. The support arms 340 and 342 are connected by a connector 344 which has a pivot point 346 attached to the annular groove 240 of the shaft 232. The kettle 200 thus pivots on the connectors 334 and 344.

In operation, a user lifts the lids 216 and 218 and adds the desired amount of corn and oil to the kettle 12 manually. However, it is to be understood that this operation may also be performed with an automatic feeder. Additionally, certain popcorn popper machines may have automatic controls with an oil pump to add oil into the kettle.

After the corn and oil is added, the lids 216 and 218 are then closed. After the completion of the popping, the user merely has to tip the kettle 200 by the handle member 242 to dispense the finished popcorn in the case 302. Thus, the need for a shaft which is inserted into the cooking compartment 214 is eliminated.

It will be apparent to those skilled in the art that various modifications and variations can be made in the method and system of the present invention without departing from the spirit or scope of the invention. The present invention is not limited by the foregoing descriptions but is intended to cover all modifications and variations that come within the scope of the spirit of the invention and the claims that follow.

What is claimed is:

1. A kettle assembly for popping corn, comprising:

a cooking chamber;

a motor chamber located beneath the cooking chamber;

a motor mounted in the motor chamber;

an agitator located in the cooking chamber, the agitator being rotatably propelled by the motor; and a pivot structure which allows cooking chamber and motor chamber to be tilted to expel popcorn from the cooking chamber.

2. The assembly of claim 1 further comprising a cylindrical body holding the cooking chamber and the motor chamber.

3. The assembly of claim 2 wherein the cooking chamber has a sloping annular side wall suspended from the cylindrical body and a bottom plate.

4. The assembly of claim 3 further comprising:

a semi-circular cover coupled to the side wall;

a semi-circular lid coupled to a hinge on the cover; and wherein the semi-circular lid is actuable between an open and closed position.

5. The assembly of claim 3 further comprising:

a first and second semi-circular lid;

a hinge mounted diametrically across the cooking chamber; and wherein the lids are coupled to the hinge and actuable between an open and closed position.

6. The assembly of claim 3 further comprising a coil-shaped heating element in the bottom plate of the cooking chamber.

7. The assembly of claim 3 further comprising a thermostat on the bottom plate of the cooking chamber.

8. The assembly of claim 2 further comprising a support frame having a first pair of support legs and an opposite pair of support legs, a first fork mounted on the first pair of support legs and a second fork mounted on the second pair of support legs; and wherein the pivot structure further includes a pair of diametrically opposed shafts on the sides of the cylindrical body, the shafts being rotatably mounted on the first and second forks to allow the cylindrical main body to pivot relative to the support frame.

9. The assembly of claim 2 wherein the motor chamber is formed by an intermediate plate mounted in the support body, the side walls of the cylindrical body and a bottom plate, wherein the motor is mounted on the intermediate plate.

10. The assembly of claim 9 further comprising insulation material between the intermediate plate and the cooking chamber.

11. The assembly of claim 9 further comprising a fan rotatably propelled by the motor.

12. The assembly of claim 11 wherein the motor further comprises a drive shaft coupled to the fan and a gear box which propels the agitator.

13. The assembly of claim 11 wherein the bottom plate has ventilation apertures in proximity to the fan.

14. A popcorn kettle for the preparation of popcorn, the kettle having:

a generally cylindrical body with an open top end;

a cooking chamber formed by a conical side wall and a bottom plate, the cooking chamber suspended from the open top end of the cylindrical body;

a motor chamber formed by the bottom end of the cylindrical body and an intermediate plate;

a motor mounted in the motor chamber; and an agitator extending through the bottom plate of the cooking chamber, the agitator rotatably propelled by the motor.

15. The kettle of claim 14 further comprising:

a semi-circular cover coupled to the side wall;

a semi-circular lid coupled to a hinge on the cover; and wherein the semi-circular lid is actuable between an open and closed position.

16. The kettle of claim 14 further comprising:

a first and second semi-circular lid;

a hinge mounted diametrically across the cooking chamber; and wherein the lids are coupled to the hinge and actuable between an open and closed position.

17. The kettle of claim 14 further comprising a coil shaped heating element in the bottom plate of the cooking chamber.

18. The kettle of claim 14 further comprising a thermostat on the bottom plate of the cooking chamber.

19. The kettle of claim 14 further comprising a fan rotatably propelled by the motor.

20. The kettle of claim 19 wherein the motor further comprises a drive shaft coupled to the fan and a gear box which propels the agitator.

21. The kettle of claim 19 wherein the bottom plate has ventilation apertures in proximity to the fan.

22. A popcorn machine for popping popcorn, the machine comprising:

a cabinet which holds finished popcorn;

a kettle suspended in the cabinet, the kettle including:

a cooking chamber having a bottom;

a heating element located in the bottom of the cooking chamber;

a motor chamber located beneath the cooking chamber;

a motor mounted in the motor chamber;

an agitator located in the cooking chamber, the agitator being rotatably propelled by the motor; and wherein the kettle is normally in an upright position and is tiltable to expel popcorn from the cooking chamber.

23. The popcorn machine of claim 22 wherein the kettle further includes a lid coupled by a hinge covering the cooking compartment and wherein the lid is actuable between an open and closed position.

24. The popcorn machine of claim 22 further comprising a controller which controls electrical power and is coupled to the motor and the heating element and activates the motor and heating element for a predetermined amount of time.

* * * * *